(12) United States Patent
Chiang

(10) Patent No.: US 7,815,447 B1
(45) Date of Patent: Oct. 19, 2010

(54) STORAGE DEVICE WITH A CASING WITH A PLUG MOVABLE PARALLEL TO A SECOND PLUG IN THE CASING

(75) Inventor: Jui-Tu Chiang, Jhonghe (TW)

(73) Assignee: Taiwin Electronics Co., Ltd. (TW)

( * ) Notice: Subject to any disclaimer, the term of this patent is extended or adjusted under 35 U.S.C. 154(b) by 0 days.

(21) Appl. No.: 12/556,563

(22) Filed: Sep. 9, 2009

(30) Foreign Application Priority Data

Apr. 29, 2009 (TW) .............................. 98111026 A

(51) Int. Cl.
*H01R 13/44* (2006.01)
(52) U.S. Cl. ..................................................... 439/131
(58) Field of Classification Search ................. 439/131, 439/171–175, 638, 956
See application file for complete search history.

(56) References Cited

U.S. PATENT DOCUMENTS 6,659,782 B2 * 12/2003 Wu ............................. 439/131
7,004,780 B1 * 2/2006 Wang ......................... 439/353
2005/0189905 A1 * 9/2005 Liang et al. .................. 320/107
2007/0263366 A1 * 11/2007 Wu et al. ..................... 361/752

* cited by examiner

*Primary Examiner*—Chandrika Prasad
(74) *Attorney, Agent, or Firm*—Hershkovitz & Associates, LLC; Abraham Hershkovitz

(57) ABSTRACT

A storage device having detachable multiple-in-one connector has a casing with one opening; a multiple-in-one plug part mounted inside the casing, exposed beyond the opening and having first and second plug assemblies detachably stacked with a gap formed therebetween; a movable assembly mounted inside the casing, connected with the second plug assembly and penetrating through the casing; and a circuit board mounted inside the casing and electrically connected with the first and the second plug assemblies, having an automatic interface switching procedure and a plurality of interface connecting procedures, having a control circuit determining the plug assembly currently in use, and selecting the interface connecting procedure corresponding to the plug assembly currently in use. Due to the multiple-in-one design, the size of the storage device can be reduced, and the storage device can be selectively plugged in a multiple-in-one or single socket connector.

20 Claims, 6 Drawing Sheets

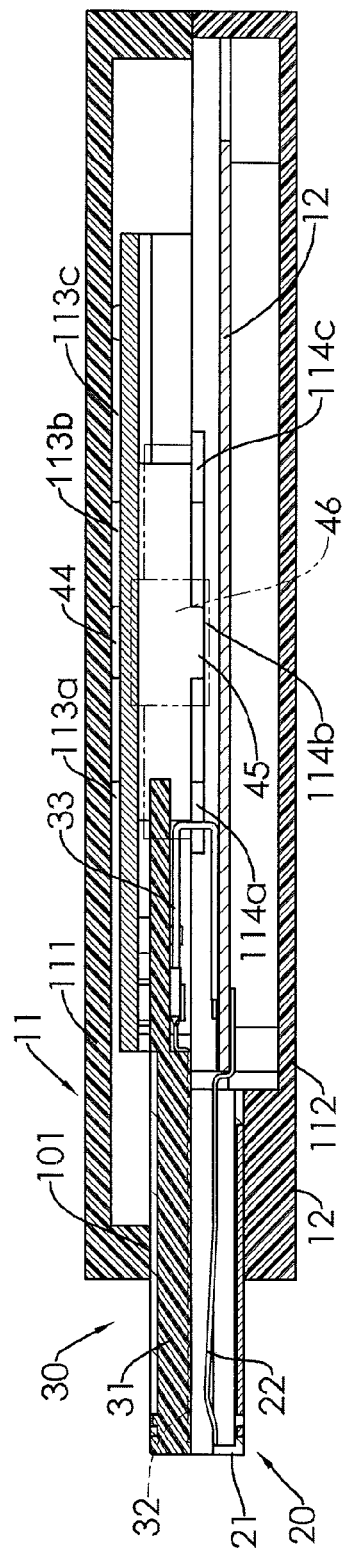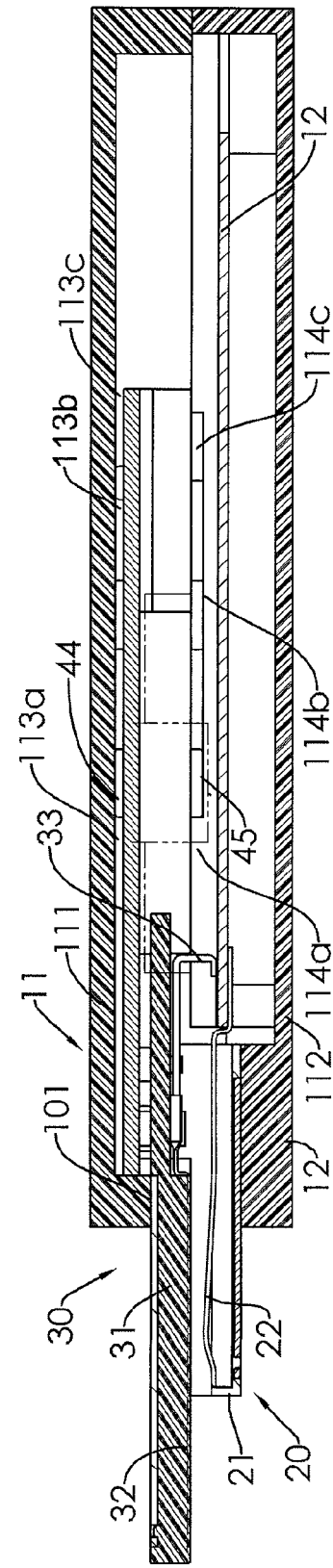
FIG.5A
FIG.5B

STORAGE DEVICE WITH A CASING WITH A PLUG MOVABLE PARALLEL TO A SECOND PLUG IN THE CASING

BACKGROUND OF THE INVENTION

1. Field of the Invention

The present invention is related to a storage device, and more particularly to a storage device having a detachable multiple-in-one connector.

2. Description of the Related Art

Common types of connectors for computer interfaces are USB, SATA, eSATA, IEEE1394 and so forth. These connectors are defined to have different transmission speed according to the communication protocols with which they comply. As a counterpart of a connector, socket connectors adopted by computer peripheral equipment or electronic devices also vary. Specific socket connectors must be mounted to those equipment or devices accordingly. However, to cope with the need of diverse interfaces, mounting various socket connectors on casing of those equipment or devices further suppresses the already limited space on the casing.

Recently, multiple-in-one socket connectors are addressed to provide one socket connector compatible with multiple plugs, thereby saving space on the computer casing. Some electronic devices of storage devices adopt two or more connector plugs with independent interfaces for users to plug in the corresponding socket connector having single interface or multiple-in-one socket connector mounted on a computer with an appropriate connector plug. However, the plurality of connector plugs may also occupy the limited space on the casing of electronic devices, meaning that electronic devices or storage devices having multiple different connectors have not met the requirements of those with the optimal multiple-in-one connector plug.

SUMMARY OF THE INVENTION

An objective of the present invention is to provide a storage device having a detachable multiple-in-one connector. In addition to reducing size, the storage device can be selectively plugged in a corresponding socket connector with a single interface or multiple-in-one interface of the multiple-in-one connector, automatically determine the current interface in use and communicate with a socket connector of a computer using a correct communication protocol.

To achieve the foregoing objective, the storage device having a detachable multiple-in-one connector has a casing, a multiple-in-one plug part, a movable assembly and a circuit board.

The casing has one opening formed at one side thereof.

The multiple-in-one plug part is mounted inside the casing, exposed beyond the opening and has a first and a second plug assemblies detachably stacked. The first and the second plug assemblies have a gap formed therebetween. The second plug assembly is slidably mounted on the casing in the opening of the casing to move in parallel with the first plug assembly.

The movable assembly is mounted inside the casing and connected with the second plug assembly, and penetrates through the casing.

The circuit board is mounted inside the casing and electrically connected with the first and the second plug assemblies, has an automatic interface switching procedure and a plurality of interface connecting procedures, has a control circuit determining the first or the second plug assembly currently in use, and selects one of the interface connecting procedures corresponding to the first or the second plug assembly currently in use.

The multiple-in-one connector is formed by stacking two plug assemblies. Therefore, the size of the storage device can be reduced. Besides, the multiple-in-one connector can be plugged in a multiple-in-one socket connector as a whole. However, as one of the plug assemblies can be horizontally moved in relation to the other plug assembly, the storage device of the present invention can be plugged in a compatible single socket connector. Besides, the storage device of the present invention is connected with different socket connectors. When executing the automatic interface switching procedure, the controller determines the plug assembly in use in accordance with the communication format of a connected socket connector and further download the interface connecting procedure corresponding to the current plug assembly to the computer having the socket connector. As a result, the computer successfully accesses the storage device of the present invention.

BRIEF DESCRIPTION OF THE DRAWINGS

FIG. 5A is a cross-sectional view taken along line 3A-3A in FIG. 1;

FIG. 5B is another cross-sectional view in FIG. 1 with an USB plug protruding.

DETAILED DESCRIPTION OF THE INVENTION

Figure 1:
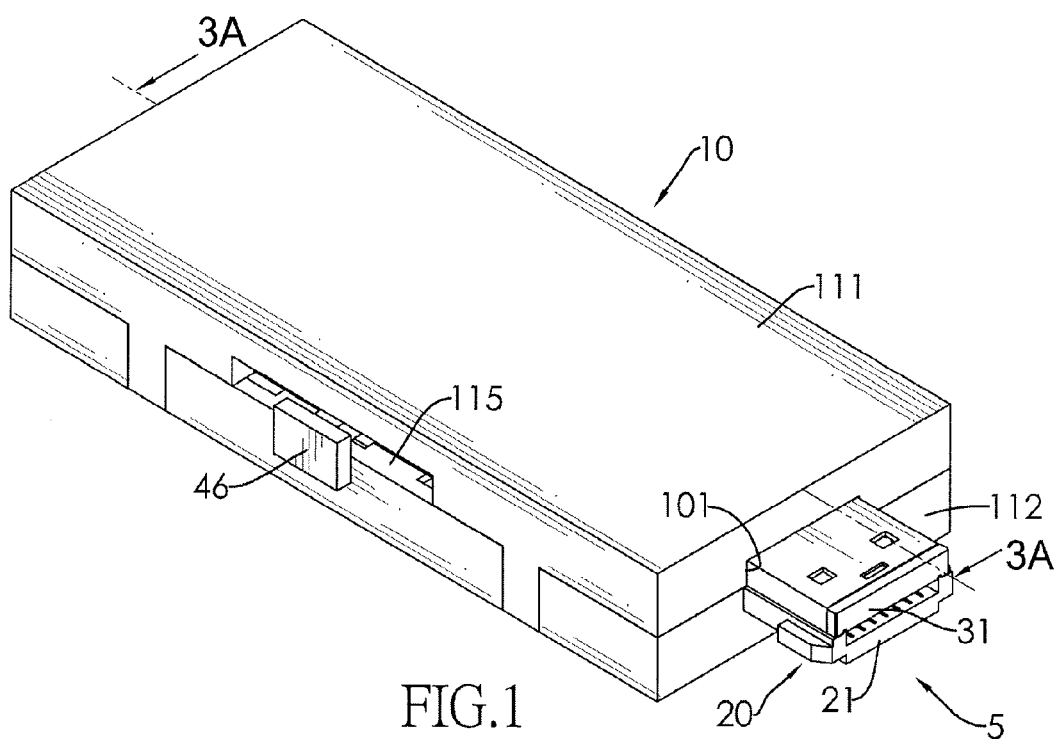
FIG. 1 is a perspective view of a preferred embodiment in accordance with the present invention.
Figure 2:
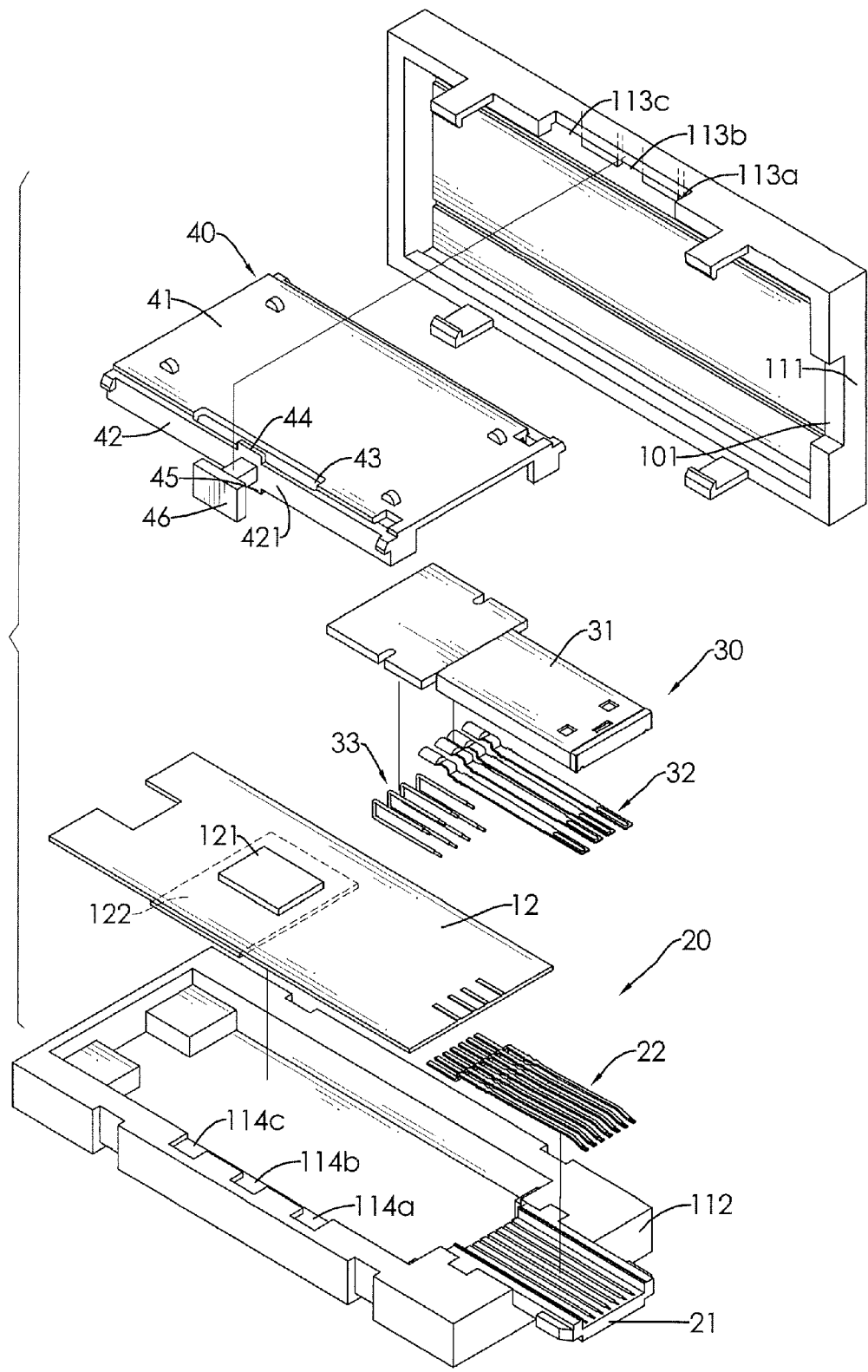
FIG. 2 is an exploded view in FIG. 1.

With reference to FIGS. 1 and 2, a storage device having a multiple-in-one connector and switchable interface has a casing (10), a multiple-in-one plug part (5), a movable assembly (40) and a circuit board (12).

The casing (10) has an opening (101) formed on one side thereof.

The multiple-in-one plug part (5) is mounted inside the casing (10), is exposed beyond the opening (101) and has two plug assemblies which are detachably stacked. There is a gap formed between the two plug assemblies. One of the two plug assemblies is slidably mounted in the opening (101) of the casing (10) to move in parallel with the other opposing plug assembly.

The movable assembly (40) is mounted inside the casing (10) and mounted to one of the plug assemblies slidably mounted in the opening (101) of the casing (10). A part of the movable assembly (40) penetrates through the casing (10).

Figure 3:
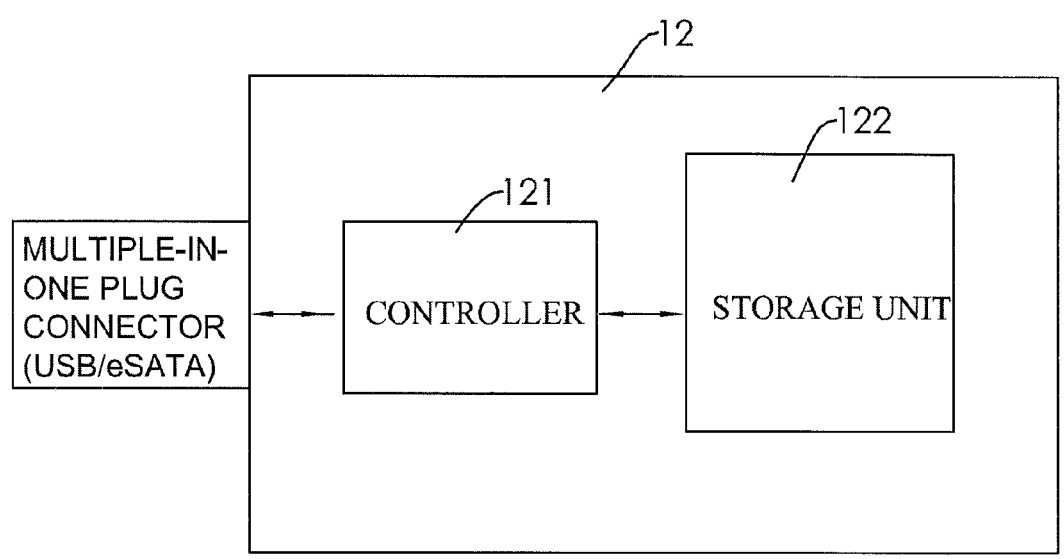
FIG. 3 is a block diagram of a control circuit in accordance with the present invention.

The circuit board (12) is mounted inside the casing (10) and is electrically connected with the two plug assemblies. The circuit board (12) has a control circuit (no reference numeral). With reference to FIG. 3, the control circuit further has a controller (121) and a storage unit (122). The controller (121) is electrically connected with the two plug assemblies of the multiple-in-one plug part and has an automatic interface switching procedure and a plurality of interface connecting procedures. The controller (121) determines the plug assembly currently in use in accordance with a connection signal between the storage device and a computer and further downloads and executes the interface connecting procedure corresponding to the plug assembly currently in use.

The storage unit (122) is electronically connected to the controller (121) for data access.

Figure 4:
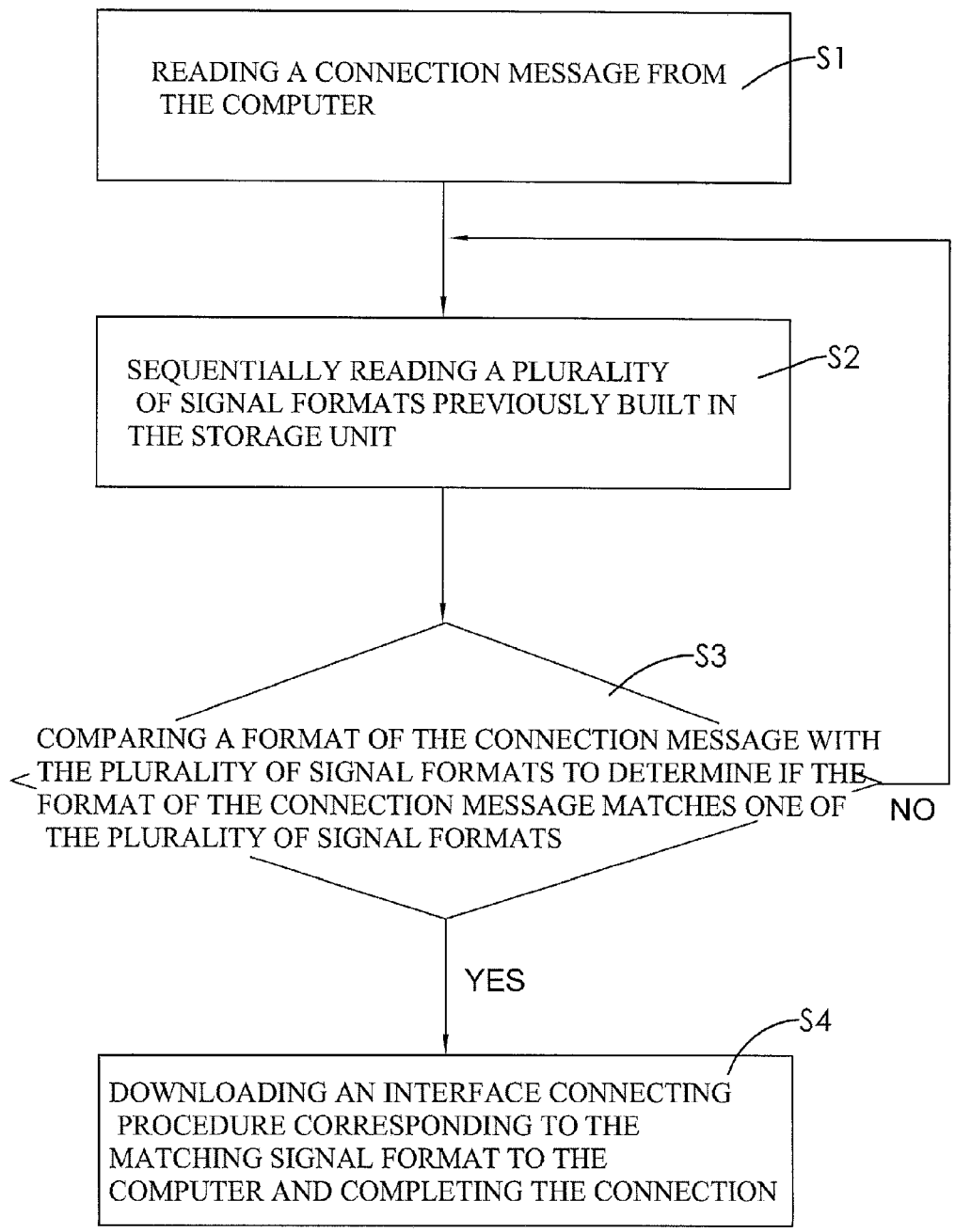
FIG. 4 is a flow diagram of an automatic interface switching procedure in accordance with the present invention.

With reference to FIG. 4, the automatic interface switching procedure in association with the multiple-in-one connection plug part of the present invention plugged in a socket connector of the computer has steps of:

reading a connection message from the computer (S1);

sequentially reading a plurality of signal formats previously built in the storage unit (S2);

comparing a format of the connection message with the plurality of signal formats to determine if the format of the connection message matches one of the plurality of signal formats (S3);

if a determining result is positive, downloading an interface connecting procedure corresponding to the matching signal format to the computer and executing the interface connecting procedure with the computer so that the computer accesses data from the storage unit (S4); and if the determining result is negative, resuming the second step (S2).

The following example is made to explain the aforementioned steps. Let one of the plug assemblies be an eSATA plug assembly and the other plug assembly be an USB plug. When the eSATA plug is the only one plugged in a single eSATA socket on the computer, the controller (121) receives an eSATA connection message from the computer. Meanwhile, the controller (121) determines that the format of the eSATA connection message matches with a built-in eSATA signal format to further download the eSATA interface connecting procedure to the computer. The controller (121) then executes the interface connecting procedure to complete the connection with the computer so that the computer can successfully access the storage device of the present invention by high-speed accessing characteristic of the eSATA communication protocol.

Alternatively, if the present invention is plugged in an USB socket of a computer with the USB plug, the controller (121) determines that the USB connection message differs from the built-in eSATA signal format. Hence, it reads a built-in USB signal format and compares again. When there is a match, the controller (121) downloads the USB interface connecting procedure to the computer and executes the interface connecting procedure to complete the connection with the computer. Therefore, the computer can successfully access data of the storage device of the present invention by the USB communication protocol.

To further describe a detailed structure of the storage device as follows:

With reference to FIGS. 1 and 5A to 5C, the casing (10) has an upper housing (111) and a lower housing (112) oppositely assembled therewith and corresponding thereto. Each of the upper and lower housing (111)(112) has two short side walls and two long side walls. The opening (101) of the casing (10) is formed through one of the two short side walls. The upper housing (111) further has a long opening (115) and at least three upper positioning slots (113a~113c). The long opening (115) is formed through one of the two long side walls. The at least three upper positioning slots (113a~113c) are formed on an inner surface of the side wall of the upper housing (111) and located directly above the long opening (115). The lower housing (112) further comprises at least three lower positioning slots (114a~114c) formed on a long side wall of the lower housing (112) and respectively aligned to the corresponding upper positioning slots (113a~113c).

The multiple-in-one connection part has a first plug assembly (20) and a second plug assembly (30). The second plug assembly (30) is connected with the movable assembly (40).

With further reference to FIGS. 2 and 5A, the first plug assembly (20) has a first plug holder (21) and at least one first terminal set (22). The first plug holder (21) horizontally extends outwardly from one of the two short side walls of the lower housing (13). The size of the first plug holder (21) may be a size of eSATA or USB plug, and the size of the first plug holder (21) in the present embodiment complies with the size of the eSATA plug.

The at least one first terminal set (22) has one end fixedly mounted on a top surface of the first plug holder (21) and the other end received in the casing (10) to electrically connect with the circuit board (12). In the preferred embodiment of the present invention, one first terminal set (22) may have seven eSATA terminals or USB terminals.

The second plug assembly (30) has a second plug holder (31), at least one second terminal set (32) and at least one second flexible wire set (33).

The second plug holder (31) is slidably mounted inside the casing (10), penetrates through the opening (101) of the casing (10), and is located above the first plug holder (21). The size of the second plug holder (31) may be the size of USB plug or eSATA plug, and the size of the second plug holder (31) in the present embodiment complies with the size of the USB plug.

The at least one second terminal set (32) is fixedly mounted on a bottom surface of the second plug holder (31). A second terminal set (32) is disclosed in the present embodiment, has four USB 2.0 terminals, and is combined with the first plug holder (21) thereunder to form a two-in-one plug. Besides, the second terminal set may include either one of live USB 2.0, USB 3.0 terminals or eSATA terminals.

The at least one second flexible wire set (33) is received in the casing (10) and is connected with the corresponding second terminal set (32). One end of each flexible wire set (33) is electrically connected with the corresponding second terminal set, and the other end is electrically connected with the circuit board (12).

With further reference to FIGS. 2 and 5A, the movable assembly (40) has a flat board (41) and a selection tab (46). The flat board (41) is located above the second plug assembly (30) and is connected with the second plug assembly (30). The flat board (41) has a vertical side wall (42) and a longitudinal through channel (43). The vertical side wall (42) is formed by extending downwardly from one side corresponding to the long opening (115). The longitudinal through channel (43) is formed through a joint between the side of the float board (41) and the vertical side wall (42) so that the vertical side wall (42) partially disconnects with the side of the flat board (41). A disconnected part of the vertical side wall (42) forms a flexible strip (421). The selection tab (46) is formed on the flexible strip (421) and penetrates through the long opening (115) as shown in FIG. 1.

When exerting force on the selection tab (46) inwardly, the selection tab (46) pushes the flexible strip (421) to bend inwardly due to the existence of the longitudinal through channel (43). Therefore, when exerting force on the selection tab (46) horizontally, the selection tab (46) can be moved forward and backward in the long opening (115).

Moreover, with reference to FIG. 5A, the flat board (41) further has an upper tab (44) and a lower tab (45) respectively extended from a top edge and a bottom edge of the flexible strip (421) corresponding to the selection tab (46). The upper and lower tabs (44)(45) are engaged in the opposite upper and lower positioning slots (113a, 114a)(113b, 114b)(113c, 114c) respectively so as to be locked and positioned therein. Owing to the three upper positioning slots (113a~113c) and the three lower positioning slots (114a~114c) located in the front, center and back of the upper housing (111) and the lower housing (112) respectively, moving the shift block (46) can adjustably position the upper tab (44) and the lower tab (45) in the front, central and rear positioning slots (113a~113c)(114a~114c). This means that the second plug assembly (20) can be moved horizontally as a result of the movement of the movable assembly.

Subsequently, detailed description about the operation of the plug of the multiple-in-one connector is given as follows:

With reference to FIGS. 2 and 5A, the plugs of the present invention serve to be plugged in a multiple-in-one socket connector of the computer. Initially, the upper tab (44) and the lower tab (45) of the flat board (41) are engaged in the central upper and lower positioning slots (113b, 114b) respectively. The first plug holder (21) of the first plug assembly (20) and the second plug holder (31) of the second plug assembly (30) are all exposed beyond the opening (101) of the casing (10) with the same length and can be simultaneously inserted in the multiple-in-one socket connector.

With further reference to FIG. 5B, the present invention serves to be plugged into an USB 2.0 socket connector of a computer. After the selection tab (46) is pressed, the flexible strip (421) is bent inwardly, stopping engagement of the upper tab (44) and the lower tab (45) with the central upper and lower positioning slots (113b, 114b). The selection tab (46) is moved forward to the front upper and lower positioning slots (113a, 114a) and then released. The deformed flexible strip (421) and the selection tab (46) are restored to their original positions, and the upper tab (44) and the lower tab (45) are engaged in the front upper and lower positioning slots (113a, 114a). Meanwhile, the second plug holder (31) of the second plug assembly (30) is extended forward to have longer length than that of the first plug holder (21) and can be inserted in the USB 2.0 socket connector individually.

Figure 5C:
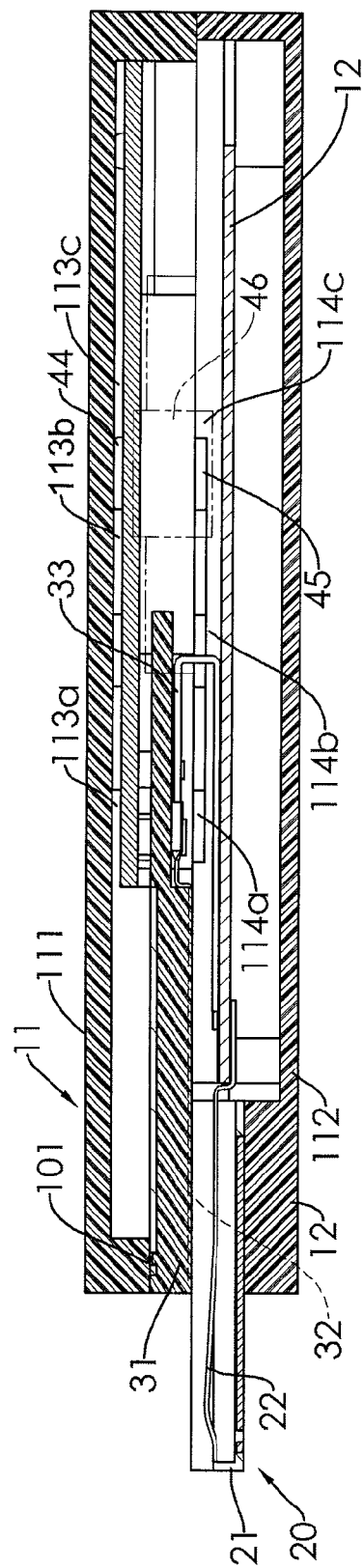
FIG. 5C is another cross-sectional view in FIG. 1 with an eSATA plug protruding.

With further reference to FIG. 5C, the present invention serves to be plugged in an eSATA socket connector. Likewise, after the selection tab (46) is pressed, the flexible strip (421) is bent inwardly, stopping engagement of the upper tab (44) and the lower tab (45) with the central upper and lower positioning slots (113b,114b). The selection tab (46) is moved backward to the rear upper and lower positioning slots (113c, 114c) and then released. The deformed flexible strip (421) and the selection tab (46) are restored to their original positions, and the upper tab (44) and the lower tab (45) are engaged in the rear upper and lower positioning slots (113c, 114c). Meanwhile, the second plug holder (31) of the second plug assembly (30) is retracted into the casing (10), and the first plug holder (21) is the only one exposed beyond the casing (10), enabling it to be inserted in the eSATA socket connector individually.

In sum, the multiple-in-one connector is formed by detachably stacking two plug assemblies. Therefore, the size of the storage device can be reduced. Besides, the storage device of the present invention can be plugged in a multiple-in-one socket connector as a whole. However, as one of the plug assemblies can be horizontally moved in relative to the other plug assembly, the storage device can be plugged in a compatible single socket connector. Besides, the storage device of the present invention can be connected with different socket connectors. When executing the automatic interface switching procedure, the controller can determine the plug assembly in use in accordance with the communication format of a connected socket connector and further download the interface connecting procedure corresponding to the current plug assembly to the computer having the socket connector. As a result, the computer can smoothly access the storage device of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A storage device having detachable multiple-in-one connector, comprising:
    a casing having one opening formed at one side thereof;
    a multiple-in-one plug part mounted inside the casing, exposed beyond the opening and having first and second plug assemblies detachably stacked, the first and second plug assemblies having a gap formed therebetween, the second plug assembly slidably mounted on the casing in the opening of the casing to move in parallel with the first plug assembly;
    a movable assembly mounted inside the casing, connected with the second plug assembly and penetrating through the casing; and
    a circuit board mounted inside the casing and electrically connected with the first and the second plug assemblies, having an automatic interface switching procedure and a plurality of interface connecting procedures, having a control circuit determining the first or the second plug assembly currently in use, and selecting one of the interface connecting procedures corresponding to the first or the second plug assembly currently in use.

2. The storage device as claimed in claim 1, wherein the control circuit further comprises:
    a controller electrically connected with the first and the second plug assemblies, having the automatic interface switching procedure and the plurality of interface connecting procedures, determining the first or the second plug assembly currently in use and downloading the interface connecting procedure corresponding to the first or the second plug assembly currently in use; and
    a storage unit electronically connected to the controller for accessing the storage unit.

3. The storage device as claimed in claim 2, wherein the automatic interface switching procedure comprises steps of:
    reading a connection message from a computer;
    sequentially reading a plurality of signal formats previously built in the storage unit;
    comparing a format of the connection message with the plurality of signal formats to determine if the format of the connection message matches one of the plurality of signal formats;
    if a determining result is positive, downloading the interface connecting procedure corresponding to the matching signal format to the computer and executing the interface connecting procedure with the computer so that the computer accesses data from the storage unit; and
    if the determining result is negative, resuming the step of sequentially reading the plurality of signal formats.

4. The storage device as claimed in claim 1, wherein the casing has an upper housing and a lower housing oppositely assembled therewith and corresponding thereto, each of the upper and lower housing has two short side walls and two long side walls, the opening of the casing is formed through one of the two short side walls, the upper housing further has a long opening and at least three upper positioning slots, the long opening is formed through one of the two long side walls, the at least three upper positioning slots are formed on an inner surface of the long side wall of the upper housing and located directly above the long opening, the lower housing further comprises at least three lower positioning slots formed on a long side wall of the lower housing and respectively aligned to the corresponding upper positioning slots.

5. The storage device as claimed in claim 2, wherein the casing has an upper housing and a lower housing oppositely assembled therewith and corresponding thereto, each of the upper and lower housing has two short side walls and two long side walls, the opening of the casing is formed through one of the two short side walls, the upper housing further has a long opening and at least three upper positioning slots, the long opening is formed through one of the two long side walls, the at least three upper positioning slots are formed on an inner surface of the long side wall of the upper housing and located right above the long opening, the lower housing further comprises at least three lower positioning slots formed on a long side wall of the lower housing and respectively aligned to the corresponding upper positioning slots.

6. The storage device as claimed in claim 3, wherein the casing has an upper housing and a lower housing oppositely assembled therewith and corresponding thereto, each of the upper and lower housing has two short side walls and two long side walls, the opening of the casing is formed through one of the two short side walls, the upper housing further has a long opening and at least three upper positioning slots, the long opening is formed through one of the two long side walls, the at least three upper positioning slots are formed on an inner surface of the long side wall of the upper housing and located right above the long opening, the lower housing further comprises at least three lower positioning slots formed on a long side wall of the lower housing and respectively aligned to the corresponding upper positioning slots.

7. The storage device as claimed in claim 4, wherein
the first plug assembly comprises:
a first plug holder extending outwardly from one of the two short side walls of the lower housing; and
at least one first terminal set having one end fixed on a top surface of the first plug holder, and the other end is received in the casing for electrically connecting with the circuit board; and
the second plug assembly comprises:
a second plug holder slidably mounted inside the casing, penetrating through the opening of the casing, located above the first plug holder and having a bottom surface;
at least one second terminal set fixed on the bottom surface of the second plug holder; and
at least one second flexible wire set received in the casing, connected with the corresponding second terminal set, one end of each of the second flexible wire set electrically connected with the corresponding second terminal set, and the other end thereof electrically connected with the circuit board.

8. The storage device as claimed in claim 5, wherein
the first plug assembly comprises:
a first plug holder extending outwardly from one of the two short side walls of the lower housing; and
at least one first terminal set having one end fixed on a top surface of the first plug holder, and the other end is received in the casing for electrically connecting with the circuit board; and
the second plug assembly comprises:
a second plug holder slidably mounted inside the casing, penetrating through the opening of the casing, located above the first plug holder and having a bottom surface;
at least one second terminal set fixed on the bottom surface of the second plug holder; and
at least one second flexible wire set received in the casing, connected with the corresponding second terminal set, one end of each of the second flexible wire set electrically connected with the corresponding second terminal set, and the other end thereof electrically connected with the circuit board.

9. The storage device as claimed in claim 6, wherein
the first plug assembly comprises:
a first plug holder extending outwardly from one of the two short side walls of the lower housing; and
at least one first terminal set having one end fixed on a top surface of the first plug holder, and the other end is received in the casing for electrically connecting with the circuit board; and
the second plug assembly comprises:
a second plug holder slidably mounted inside the casing, penetrating through the opening of the casing, located above the first plug holder and having a bottom surface;
at least one second terminal set fixed on the bottom surface of the second plug holder; and
at least one second flexible wire set received in the casing, connected with the corresponding second terminal set, one end of each of the second flexible wire set electrically connected with the corresponding second terminal set, and the other end thereof electrically connected with the circuit board.

10. The storage device as claimed in claim 7, wherein
the movable assembly comprises:
a flat board having a vertical side wall formed by extending downwardly from one side corresponding to the long opening, and a longitudinal through channel formed through a joint between a side of the float board and the vertical side wall so that the vertical side wall partially disconnects with the side of the flat board and a disconnected part of the vertical side wall forms a flexible strip; and
a selection tab formed on the flexible strip and penetrating through the long opening of the casing.

11. The storage device as claimed in claim 8, wherein
the movable assembly comprises:
a flat board having a vertical side wall formed by extending downwardly from one side corresponding to the long opening, and a longitudinal through channel formed through a joint between a side of the float board and the vertical side wall so that the vertical side wall partially disconnects with the side of the flat board and a disconnected part of the vertical side wall forms a flexible strip; and
a selection tab formed on the flexible strip and penetrating through the long opening of the casing.

12. The storage device as claimed in claim 9, wherein
the movable assembly comprises:
a flat board having a vertical side wall formed by extending downwardly from one side corresponding to the long opening, and a longitudinal through channel formed through a joint between a side of the float board and the vertical side wall so that the vertical side wall partially disconnects with the side of the flat board and a disconnected part of the vertical side wall forms a flexible strip; and
a selection tab formed on the flexible strip and penetrating through the long opening of the casing.

13. The storage device as claimed in claim 10, wherein an upper tab and a lower tab extended from a top edge and a bottom edge of the flexible strip corresponding to the selection tab, and the upper tab and the lower tab are respectively and selectively engaged in the opposite upper and lower positioning slots.

14. The storage device as claimed in claim 11, wherein an upper tab and a lower tab extended from a top edge and a bottom edge of the flexible strip corresponding to the selection tab, and the upper tab and the lower tab are respectively and selectively engaged in the opposite upper and lower positioning slots.

15. The storage device as claimed in claim 12, wherein an upper tab and a lower tab are extended from the vertical side wall to correspond to the selection tab, and the upper tab and the lower tab are respectively and selectively engaged in the opposite upper and lower positioning slots.

16. The storage device as claimed in claim 13, wherein the first plug assembly is horizontally extended out from the front end of the lower housing.

17. The storage device as claimed in claim 14, wherein the first plug assembly is horizontally extended out from the front end of the lower housing.

18. The storage device as claimed in claim 15, wherein the first plug assembly is horizontally extended out from the front end of the lower housing.

19. The storage device as claimed in claim 7, wherein the first plug holder complies with a size of an eSATA plug; and the second plug holder complies with a size of an USB plug.

20. The storage device as claimed in claim 7, wherein the first plug holder complies with a size of an USB plug; and the second plug holder complies with a size of an eSATA plug.

\* \* \* \* \*